United States Patent [19]
Shouse

[11] Patent Number: 5,207,724
[45] Date of Patent: May 4, 1993

[54] CUTTING INSERT AND RETAINER

[76] Inventor: Virgil Shouse, 290 N. Alloy Dr., Fenton, Mich. 48430

[21] Appl. No.: 884,369

[22] Filed: May 18, 1992

[51] Int. Cl.⁵ ........................................... B23B 27/16
[52] U.S. Cl. ................................. 407/108; 407/112
[58] Field of Search ............................ 407/106–108, 407/112

[56] References Cited

U.S. PATENT DOCUMENTS

| Re. 26,168 | 3/1967  | Lundgren       | 407/107 X |
| 3,754,309  | 8/1973  | Jones et al.   | 407/107 X |
| 3,987,524  | 10/1976 | Hochmuth et al.| 407/112   |
| 4,035,887  | 7/1977  | Hertel         | 407/107 X |
| 4,545,705  | 10/1985 | Benson         | 407/108   |
| 4,669,924  | 6/1987  | Benson         | 407/108 X |
| 5,033,916  | 7/1991  | Dunklau        | 407/107 X |

FOREIGN PATENT DOCUMENTS 891231 12/1981 U.S.S.R. ............................ 407/107

*Primary Examiner*—Steven C. Bishop
*Attorney, Agent, or Firm*—Krass & Young

[57] ABSTRACT

An improved cutting tool insert for an assembly comprising a tool holder having an engagement pocket, the cutting insert configured generally as a polyhedral cutting element and adapted to engage the pocket in the tool holder, and a clamping member adapted to retain the insert in the pocket. A planar clamp bearing surface is formed in the insert oblique to the longitudinal, horizontal, and vertical axes of the insert such that pressure exerted by the clamping member on the bearing surface causes the insert to seat in the pocket and be held in place thereby.

11 Claims, 2 Drawing Sheets

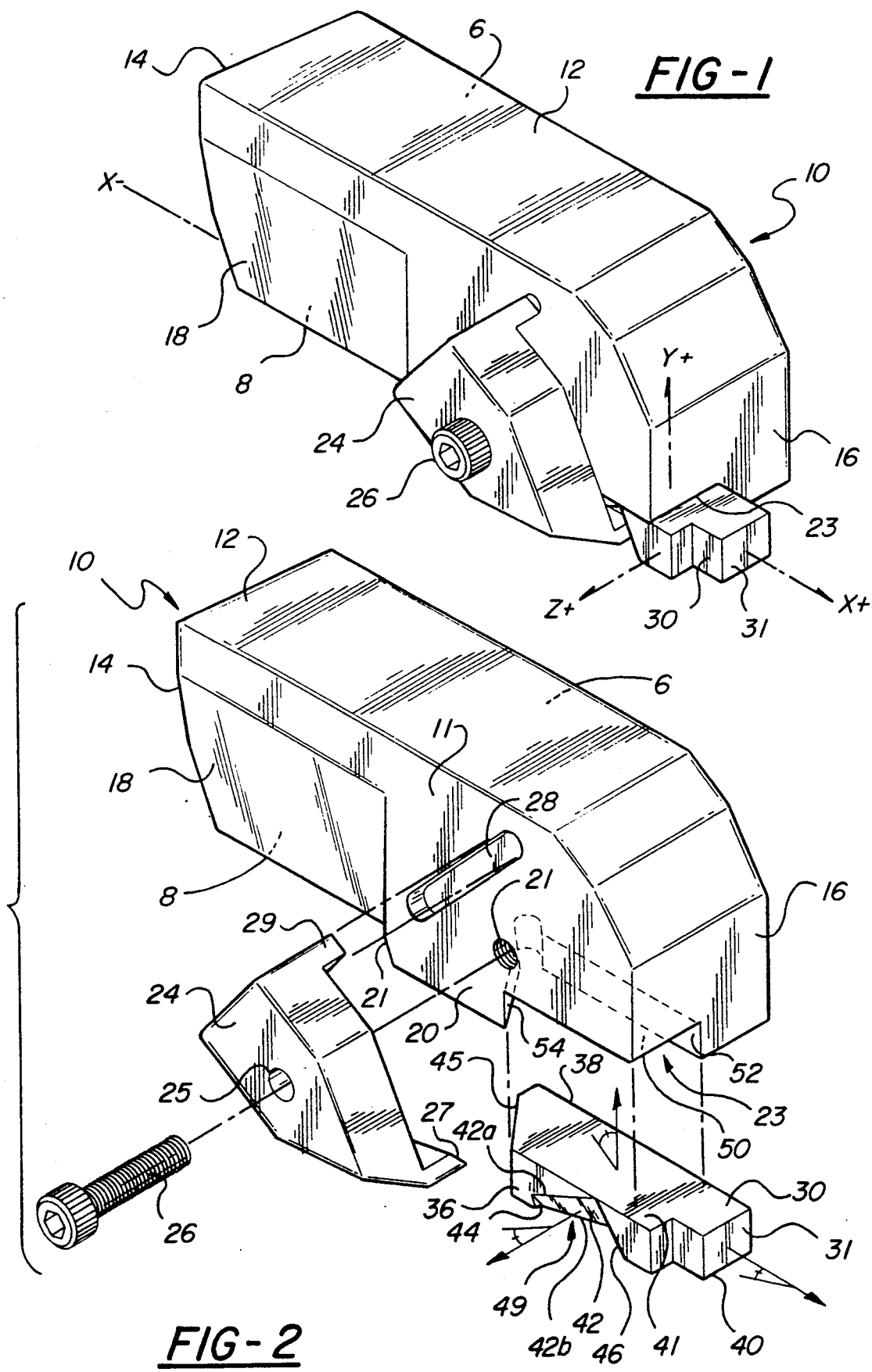

CUTTING INSERT AND RETAINER

FIELD OF THE INVENTION

This application relates to a cutting tool and cutting tool holder, and more particularly, to means for securing the cutting tool to the tool holder.

BACKGROUND OF THE INVENTION

Tool holders and associated cutting tools are routine fixtures in today's industrial environment. For many applications, the most cost effective method of performing the cutting operation is to provide a sturdy, reusable cutting tool holder with a relatively inexpensive and disposable cutting tool insert. These inserts may be made of specialized metals suitable for performing the cutting operation, and are often equipped with carbide or diamond cutting tips.

During the cutting operation, the insert is subjected to substantial vertical, horizontal, and lateral forces. To insure the close tolerances demanded in modern cutting applications, it is essential that the insert be secured against these forces.

A number of systems have been developed for securing cutting tool inserts in associated holding devices. U.S. Pat. Nos. 4,669,924 and 4,545,705, issued to Benson, disclose a method for securing the cutting tool insert to the tool holder. Typically, a clamp having a beveled face engages a corresponding beveled surface in the cutting tool insert. The clamping member exerts a lateral force tending to squeeze the insert tightly against one side of the tool. This methodology, however, is not altogether satisfactory in that it does bring the insert into a secure holding relationship with the rear wall of the pocket in which the cutting tool insert is mounted and, accordingly, does not adequately secure the insert against forces acting in all three axes.

A similar effort was made by Jones, et al, as shown in U.S. Pat. No. 3,754,309. In this device, a vertical force is exerted against a diagonal slot in the tool insert, in an effort to reduce front to back motion of the cutting insert in the tool holder. Cutting tool inserts and clamps manufactured by the Sandvik Company utilizes similar engagement geometry between the clamping member and the insert.

The prior art fails to adequately address the problem of holding the cutting inserts securely in place against forces acting in all three axes. Therefore, there is a need in the industry for a means of automatically positioning and securing a cutting tool insert against forces acting in all three axes.

SUMMARY OF THE INVENTION

The present invention comprises a generally polyhedral cutting tool insert adapted to be secured to the holder by the clamping member. The insert has a planar clamp bearing surface disposed obliquely to the longitudinal, horizontal, and vertical axes of the insert such that pressure exerted by a clamping member on the bearing surface causes the insert to seat in the holder and be held in place thereby against forces acting in all three major axes.

According to the present invention, the cutting insert is formed with a recess communicating with both the top and one side surface of the insert. The plane comprising the bottom of the recess is oriented obliquely to both the top surface and side surface which it intersects. In the preferred embodiment, the resulting bearing surface faces slightly forward, toward the cutting end of the insert.

An associated clamping member is removably affixed to a cutting tool. The cutting tool is provided with a pocket adapted to receive and engage at least one side, bottom and end surface of the cutting insert. The clamping member is provided with a wedge-shaped face, which is oblique to the top and one side surface of the insert, when the clamping member is in its clamped position. Further, the angle of the clamping face of the insert is selected to engage the recess of the insert so that downward pressure on the clamping member exerted by the clamp fastening screw is transmitted to the face of the recess of the insert, thereby driving the insert downward against the bottom of the pocket, inward against the side of the pocket and rearward against the back of the pocket, simultaneously. This simultaneous clamping force is transmitted without the requirement for precisely located front and rear walls of the recess, simplifying the manufacture of the insert, and eliminating breakage.

BRIEF DESCRIPTION OF THE DRAWINGS

The above objects of the invention, as well as others, will be readily apparent by reference to the specification, and the following drawings in which:

FIG. 1 is a perspective view of the assembled tool holder, cutting insert and clamp;

FIG. 2 is an exploded perspective view of the components of FIG. 1;

DETAILED DESCRIPTION OF THE PREFERRED EMBODIMENT

Figure 3:
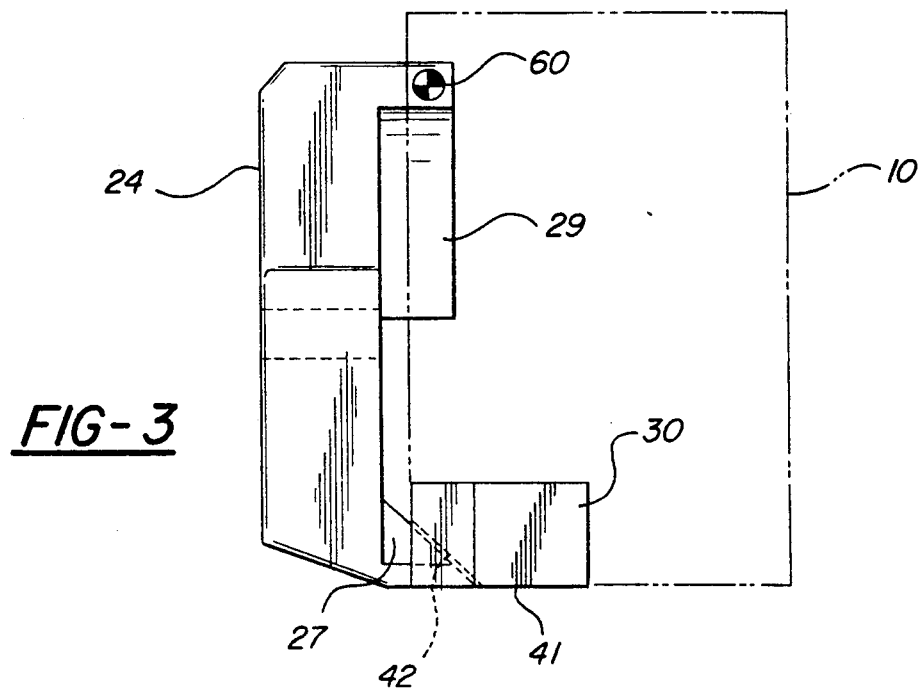
FIG. 3 is a side view of the juxtaposed cutting insert and clamp.

An overview of the invention will be apparent from a review of FIGS. 1 and 2. A tool holder 10 is formed from a block of raw material, such as tool steel. The completed tool holder has a top surface 12, a bottom surface 8, a first side 6, and a second side 18. The base end 14 is typically held in an industrial cutting machine, so as to place the entire tool assembly 10 in proximity to a workpiece. A working end 16 is disposed opposite the base end 14. The term "working end" is adopted to identify that end of the tool on which an actual cutting insert 30 may be mounted.

An offset side wall 20 communicates with a pocket 23 in which the cutting tool insert 30 is held during the cutting operation. Clamp 24 engages insert 30, and is held in position by fastener 26. The completed assembly, therefore, comprises a tool holder 10, clamp 24 and cutting insert 30. The assembly is removably attached to an industrial cutting machine in such a fashion as to place the working end 31 of cutting tool 30 into contact with the workpiece being cut.

A typical example of such a commercial cutting machine is a lathe, and a typical workpiece is a internal combustion engine piston. In such a cutting operation, an internal combustion engine piston would be mounted for high speed rotation along its cylindrical axes on the lathe spindles. The cutting tool assembly would then be brought into proximity with the workpiece, so as to cause the working end 31 of the cutting insert 30 to engage the workpiece, for example, for the purpose of cutting a groove in the circumference of the workpiece to accommodate a piston ring. The finished working end 31 of the insert 30 would be configured for the particular intended application, such as having a hardened cutting tip where the indentation on the working end 31 is shown in the drawings.

As can be seen from FIG. 2, depending on the details of the cutting operation, including the direction of motion of the workpiece in relation to the cutting tool assembly, three dimensional forces are imposed on the cutting tool insert 30 during cutting operations. Along the x-axis, a line parallel to the longitudinal centerline of the tool holder, cutting operations may tend to pull the cutting tool insert away from the cutting tool holder in the x+ direction. Lateral forces tending to push the cutting tool toward the open side of the pocket can be said to be acting in the z+ direction. Finally, forces exerted by the workpiece against the cutting tool insert tending to raise the insert upward in the pocket can be said to be acting in the y+ direction.

To contain the cutting tool insert against forces acting in the above three planes, the cutting tool insert 30 and clamp 26 are provided with novel engagement faces, as can be seen in more detail with reference to FIG. 2. By separating the components in an exploded view, the various features of the three main components comprising the tool assembly will be better understood. Again, the tool holder 10 comprises an essentially polygonal monolith, having a top surface 12, gripped base end 14, a working end 16, a bottom surface 8, a first side 6, a second side 18, and an offset side 20, displaced from first side 16 by offset 21. A pocket 23 is formed proximate the working end 16 and offset side 20 of the tool holder 10. The pocket further comprises back surface 54, side surface 52 and bottom surface 50. A cross-section of the pocket 23, when viewed from the working end 16 of tool holder 12 is essentially rectangular, and corresponds in size and shape to the cross-section when viewed from the working end 31 of cutting tool insert 30. In this fashion, the top 41 of cutting tool insert 30 engages the bottom surface 50 of pocket 23, the side surface 38 of cutting insert 30 engages the side surface 52 of pocket 23, and the rear surface 45 of cutting insert 30 engages rear surface 54 of the cutting tool holder 12.

To secure insert 30 to tool holder 12, insert 30 is provided with a recess 49 having a planar bearing surface 42 intersecting the side 36 of insert 30, as well as the bottom 40 of insert 30. Surface 42 intersects the side 36 of insert 30 at intersection 42a, and intersects the bottom 40 at intersection 42b. With further reference to FIG. 3, it can be seen that intersection 42b constitutes a line which is oblique to rear wall 45 of insert 30, and intersection 42a is similarly oblique to top surface 41 of insert 30. Thus, the surface 42 is disposed obliquely to the three major axes of the insert 30.

After being placed into the pocket 23, insert 30 is secured against movement by the installation of clamp 24. A leg 29 of clamp 24 engages recess 28 formed in the tool holder 12. Recess 28 is oriented to insure engagement of the clamp with clamp bearing surface 42. Tool holder 12 is further provided with a threaded hole 21, suitable to engage a threaded fastener 26 which is passed through a hole 25 in clamp 24. Tightening of screw 26 brings clamping cam surface 27 into engagement with recessed bearing surface 42 of insert 30. Further tightening of screw 26 causes cam 27 to exert pressure against face 42 as will be hereinafter explained.

Figure 4:
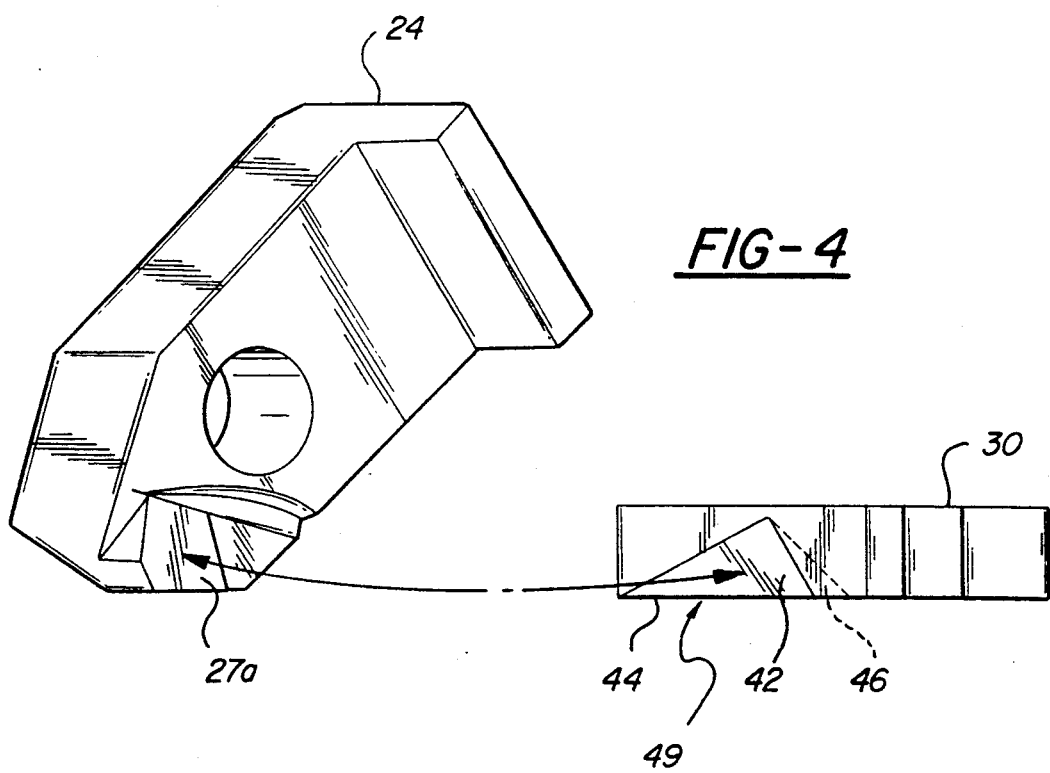
FIG. 4 is an elevation of the clamp and cutting insert, spaced apart to show the respective faces which are engaged when the invention is assembled.

FIG. 3 presents a simplified view of clamp 24 and insert 30 as viewed from the side. Tool holder 10 is omitted for clarity. Clamp 24 can be viewed as a lever, functionally pivoting about pivot point 60 when leg 29 is inserted in the cavity 28 shown in FIG. 2. Downward pressure exerted by screw 26 urges both leg 29 and cam 27 downward toward insert 30. Because recess 28 is of limited depth, leg 29 seats against the bottom of recess 28, restricting further downward movement of leg 29. Further, downward pressure on clamp 24 accordingly, is transmitted in the form of a downward rotational force of cam 27 against recess face 42. Because of the orientation of recess face 42 on insert 30, downward pressure from cam 27 translates into simultaneous downward, sideward and rearward pressure of insert 30 in relation to the pocket. With reference to FIG. 1, these forces are transmitted in the x−, y− and z− directions, simultaneously. In this fashion, tightening of fastener 26 serves to seat the insert 30 in the pocket 23 against the respective surface and secure the insert 30 against movement in all three axis. The sideward and downward forces exerted by cam 27 are transmitted to face 42 by cam face 27a, as depicted in FIG. 4.

While, in the preferred embodiment, the recess 42 is formed in the insert 30 in such a fashion as to create front recess wall 46 and rear recess wall 44, a benefit of the invention is the elimination of the need for either a front wall 46 or rear wall 44. Since the cam 27 transmits its securing forces to insert 30 by pressure of the cam face 27a against the recess face 42, rearward clamping forces in the x-direction are independent of any engagement of the clamp 24 with the insert recess rear surface 44. Likewise, insert 30 is formed of a size and shape to insure positive engagement of rear surface 38 of insert 30 with rear surface 54 of tool holder 12, without the need for clamp 24 to engage a forward surface 46 of the tool insert. This feature, as shown in FIG. 4, allows for greatly simplified tool insert manufacture, without regard for exact placement of the tool insert recess 42. A more or less continuous recess face 42, as shown in FIG. 4, can be formed in insert 30, to position approximate the working end 34 of insert 30, while insuring positive engagement between the insert and the tool holder.

With reference to FIG. 2, it has been shown that surface 42 is disposed obliquely to the three major axes of the insert to cause the insert to seat in the holder pocket and be held in place. In the most preferred embodiment the surface forms an angle to each axes in the range of 20°–45° so as to divide the clamping force into components of generally similar magnitudes directed along the three axes. In one specific embodiment, the surface forms an angle of 38° to the longitudinal (x) axis, 23° to the vertical (y) axis, and 30° to the horizontal (z) axis. Other combinations of angles within that range are equally possible.

Having thus fully described my invention, it is apparent that numerous obvious modifications and improvements may be made to it, without departing from the substance and spirit of my invention, in which I claim:

1. A cutting insert having top and side surfaces for a cutting tool assembly having a tool holder and a clamping member, the insert comprising:
a generally polyhedral cutting tool insert adapted to be secured to the holder by the clamping member, said insert having a single planar clamp bearing surface intersecting the top surface and one side surface of said insert, the intersections of said planar bearing surface being oblique to the edges of said top surface and said one side surface of said insert disposed obliquely to the longitudinal, horizontal, and vertical axes of said insert, said planar clamp bearing surface being recessed into said insert so as to form substantially parallel forward and rear recess surfaces, said planar clamp bearing surface such that pressure exerted by said clamping member on said bearing surface causes said insert to seat in said holder and be held in place thereby.

2. The insert of claim 1, wherein said bearing surface forms an angle in the range of 20°–45° to each said axis.

3. The insert of claim 1, wherein said bearing surface forms an angle of about 38° to the longitudinal axis, about 23° to the vertical axis, and about 30° to the horizontal axis.

4. In a cutting tool assembly comprising a tool holder having an engagement pocket, a cutting insert configured generally as a polyhedral cutting element and adapted to engage the pocket in the tool holder, said insert having top and side surfaces and a clamping member adapted to retain the insert in the pocket, the improvement comprising:

at least one wedge-shaped projection having a planar clamping surface adapted to bear on said insert included on said clamping member; and a single planar clamp bearing surface formed in said insert, said bearing surface being disposed obliquely to the longitudinal, horizontal, and vertical axes of said insert, said planar clamp bearing surface being recessed into said insert so as to form substantially parallel forward and rear recess surfaces, said planar clamp bearing surface intersecting the top surface and one side surface of said insert, the intersections of said planar bearing surface being oblique to the edges of said top surface and said one side surface of said insert such that said planar clamping surface of said clamping member bears on said planar clamp bearing surface and pressure exerted by said clamping member on said bearing surface causes said insert to seat in said pocket and be held in place thereby.

5. The insert of claim 4, wherein said bearing surface forms an angle in the range of 20°–45° to each said axis.

6. The assembly of claim 4, wherein said clamping member is pivotably affixed to said tool holder proximate said pocket.

7. The assembly of claim 4, wherein said assembly further comprises a threaded fastening means removably securing said clamping member to said tool holder.

8. The insert of claim 4, wherein said bearing surface forms an angle of about 38° to the longitudinal axis, about 23° to the vertical axis, and about 30° to the horizontal axis.

9. A cutting tool holder assembly comprising:

a cutting tool having a top surface, a bottom surface parallel to said top surface, two opposing parallel side surfaces, a cutting end and a mounting end and having a longitudinal, horizontal, and vertical axes defined therein;

a tool holder having a top surface, a bottom surface, first and second side surfaces, a working end, and a bottom end, said holder having a pocket formed therein and adapted to receive said cutting tool insert;

a clamping recess formed in said cutting tool insert, said recess having substantially parallel forward and rear recess surfaces and a single planar bearing surface intersecting said top surface of said cutting tool insert and one said side surface of said insert, the intersections of said planar bearing surface being oblique to the edges of said top surface and oblique to the edges of said side surface;

a clamping member pivotably affixed to said tool holder proximate said pocket, said clamping member further comprising at least one wedge-shaped projection having a planar clamping surface adapted to engage said clamping recess of said cutting tool;

a positioning seat disposed on said tool holder for restrictively engaging said clamping member, whereby said clamping member is restricted from rotational displacement in an axes parallel to said top surface of said tool holder; and threaded fastening means removably securing said clamping member to said tool holder, and for bring said wedge-shaped face into engagement with said cutting tool insert in said pocket, whereby said clamping member engages said clamp bearing surface of said cutting tool insert holding said cutting tool insert in a fixed predetermined position in said pocket of said tool holder.

10. The insert of claim 9, wherein said bearing surface forms an angle in the range of 20°–45° to each said axis.

11. The insert of claim 9, wherein said bearing surface forms an angle of about 38° to the longitudinal axis, about 23° to the vertical axis, and about 30° to the horizontal axis.

* * * * *